United States Patent Office 3,513,155
Patented May 19, 1970

3,513,155
SULFOXIDES OF 7-HALO-7-DEOXYLINCOMYCINS AND PROCESS
Robert D. Birkenmeyer, Comstock Township, Kalamazoo County, and Fred Kagan, Kalamazoo, Mich., assignors to The Upjohn Company, Kalamazoo, Mich., a corporation of Delaware
No Drawing. Filed May 7, 1968, Ser. No. 727,353
Int. Cl. C07c 47/18
U.S. Cl. 260—210                              20 Claims

ABSTRACT OF THE DISCLOSURE

Novel antibacterial compounds of the formula:

$$\begin{array}{c} CH_3 \\ \sim|\sim Halo \\ Ac-NH-|\overline{6} \\ HO \quad |_5-O \\ \quad \langle 4\ OH \quad 1 \rangle\ O \\ \quad \ 3\ 2\ /\ S-R \\ \quad\quad OH \end{array} \qquad (I)$$

are prepared by sulfoxidizing a compound of the formula:

$$\begin{array}{c} CH_3 \\ \sim|\sim X \\ Ac-NH-|- \\ HO \quad |-O \\ \quad \langle\ OH \rangle \\ \quad\quad OH \quad S-R \end{array} \qquad (II)$$

wherein Ac is hydrogen or basic acyl and X is hydroxy or halogen, and when X is hydroxy replacing the 7-hydroxy group with halogen. Any or all of the 2-, 3-, and 4-hydroxy groups can be esterified or etherified before or after the halogenation.

BRIEF SUMMARY OF INVENTION

This invention relates to novel compounds and to processes for preparing them, and is particularly directed to sulfoxides of 7-halo-7-deoxylincomycins, i.e., sulfoxides of 7(S)-halo-7-deoxylincomycin and 7(R)-halo-7-deoxylincomycin and analogs thereof, as well as esters and ethers thereof, and to processes whereby they and like compounds are produced.

The novel compounds of the invention can be represented by the following structural formula:

$$\begin{array}{c} CH_3 \\ \sim|\sim Halo \\ Ac-NH-|\overline{6} \\ HO \quad |_5-O \\ \quad \langle 4\ OH \quad 1 \rangle\ O \\ \quad \ 3\ 2\ /\ S-R \\ \quad\quad OH \end{array} \qquad (I)$$

wherein Halo is chlorine, bromine, or iodine; R is alkyl of not more than 20 carbon atoms, advantageously not more than 8 carbon atoms, cycloalkyl of from 3 to not more than 8 carbon atoms, or aralkyl of not more than 12 carbon atoms, advantageously not more than 8 carbon atoms; and Ac is hydrogen the acyl radical of a 4-substituted-L-2-pyrrolidinecarboxylic acid of the formula:

$$\begin{array}{cc} HR_2 & R_3 \\ | & | \\ N & N \\ \text{(A)} & \text{or} \quad \text{(B)} \\ R_1\ \ C-OH & HR_1\ \ C-OH \\ \quad\ O & \quad\ O \end{array}$$

wherein $R_1$ and $R_2$ are alkylidene of not more than 20 carbon atoms (including methylene), advantageously not more than 8 carbon atoms, cycloalkylidene of from 3 to not more than 8 carbon atoms, or aralkylidene of not more than 12 carbon atoms, advantageously not more than 8 carbon atoms; and $R_3$ is hydrogen or $HR_2$. Any or all of the 2-, 3-, and 4-hydroxy groups can be esterified or etherified.

Examples of alkyl of not more than 20 carbon atoms (R, $HR_1$, and $HR_2$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl. Examples of aralkyl are benzyl, phenethyl, α-phenylpropyl, and α-naphthylmethyl. Examples of alkylidene, cycloalkylidene, and aralkylidene groups ($R_1$ and $R_2$) include methylene, ethylidene, propylidene, butylidene, pentylidene, hexylidene, heptylidene, octylidene, heptadecylidene, octadecylidene, nonadecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and α-nathphylmethylene.

The novel compounds of the invention, Formula I, as well as other related compounds, can be prepared by sulfoxidizing a compound of the formula:

$$\begin{array}{c} CH_3 \\ \sim|\sim X \\ Ac-NH-|\overline{6} \\ HO \quad |_5-O \\ \quad \langle 4\ OH \quad 1 \rangle \\ \quad \ 3\ 2\ /\ S-R \\ \quad\quad OH \end{array} \qquad (II)$$

wherein X is hydroxy or halogen, and when X is hydroxy, replacing it with halogen. Ac can be hydrogen or any basic acyl radical and R can be the radical of any mercaptan. The replacement of the 7-OH by chlorine or bromine is effected advantageously by mixing the starting compound of Formula II with Rydon reagent and heating. Where halo is chlorine the replacement can also be effected by heating with thionyl chloride. When halo is iodine (as well for chlorine or bromine) the replacement can be effected by a modified Rydon reagent process.

The novel compounds of the invention can also be prepared by acylating a compound of Formula I wherein Ac is hydrogen. The latter compounds can be prepared by replacing the 7-hydroxy groups of a compound of the formula:

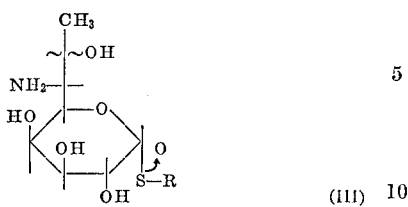

by the procedure given above.

Sulfoxidizing as used herein refers to a process in which a mercaptan, or mercaptan-like compound, is exposed to sufficiently mild oxidizing conditions as to form a sulfoxide without substantially further oxidation. It has been found according to this invention that unlike 1-thioglycosides generally, which oxidize all the way to the sulfone (Horton and Hutson, Recent Advances in Carbohydrate Chemistry, vol. 18, pp. 144–7, 1963), the 1-thioglycosides which are the subject of this invention, that is, compounds of Formula II wherein Ac is hydrogen or a basic acyl group, form sulfoxides essentially to the exclusion of sulfones when the sulfoxidation is effected in a substantially neutral aqueous solution. Under these conditions the 1-thioglycosides of Formula II are essentially in the acid addition salt form. In this wise attack on primary and secondary amino groups, for example, where Ac is hydrogen or 4-propyl-L-2-pyrrolidinecarboxacyl as in the case of lincomycin D (N-demethyllincomycin) or 7(S)-chloro-7-deoxylincomycin), is avoided. Also where the basic acyl group is tertiary, as in the case of lincomycin and 7(S)-chloro-7-deoxylincomycin, formation of the N-oxide is avoided. Thus the processes of the invention though using well-known sulfoxidizing agents are non-analogous because atypical results are obtained (sulfoxides are obtained whereas oxidation of other 1-thioglycoside gives sulfones) and in that the basic functions are protected by forming the acid addition salts thereof.

U.S. Pat. 3,382,230 discloses the preparation of 1-thio-α-lincosaminide sulfoxides of the Formula III:

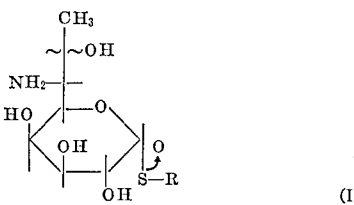

using sodium periodate as the oxidizing agent. This oxidizing agent is so strong, however, that substantially oxidation to the sulfone, with attendant complications in recovery of the desired sulfoxide, results. Moreover, the process cannot be applied to the free sugar but only to the fully acylated sugar.

Moreover, periodate oxidation is a recognized analytical tool commonly used for determining structure of sugars including 1-thioglycosides (Horton and Hutson, supra). Periodate oxidation, therefore, cannot be considered a sulfoxidation even though under the special conditions of U.S. Pat. 3,382,230 some sulfoxide is formed.

Ac can also be a radical of a 4-substituted-L-2-pyrrolidinecarboxylic acid of the formula:

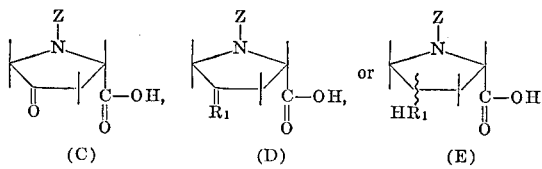

wherein Z is a protective group removable by hydrogenolysis or solvolysis U.S. Pat. 3,301,871, in which case, either before or after the sulfoxidation the resulting acylates can be processed according to U.S. Pat. 3,380,992 to form product in which the acyl groups correspond to acids A and B.

The $HR_1$- group can be in either the cis or trans position as illustrated in the following formulas:

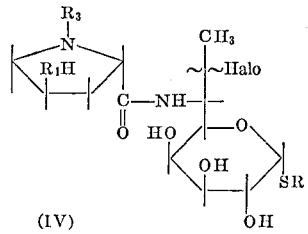

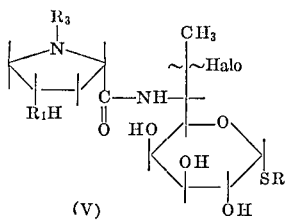

If desired, the cis and trans isomers can be separated by counter current distribution or chromatography, either before or after sulfoxidation or before or after replacement of the 7-hydroxy group.

When $R_3$ in Formulas B, IB, and IIB is hydrogen (Formulas IB and IIB are, respectively, Formulas I and II wherein Ac is the acyl of acid B), it can be replaced by suitable alkylation or like procedure. Advantageously, this replacement is effected by reacting the compound according to Formula B, IB, or IIB, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutylmethyl ketone, benzaldehyde, phenylacetaldehyde, hydrocinnamaldehyde, acetophenone, propiophenone, butyrophenone, 3-methyl-4-phenyl-2-butanone, 2 - methyl-5-phenyl-3-pentanone, 3 - cyclopentanepropionaldehyde, cyclohexaneacetaldehyde, cycloheptanecarboxaldehyde, 2,2 - dimethylcyclopropylacetaldehyde, 2,2 - dimethylcyclopropyl methyl ketone, cyclopentyl methyl ketone, cyclobutyl methyl ketone, cyclobutanone, cyclohexanone, 4-methylcyclohexanone, and the like.

The novel compounds of the invention have in vitro and in vivo antibacterial activity and can be administered orally or parenterally to animals, including mammals, for the alleviation of bacterial infections especially those caused by gram positive bacteria such as *Staphylococcus aureus* and *Streptococcus hemolyticus*. For example, 7(S)-chloro-7-deoxylincomycin sulfoxide has in vivo antibacterial activity comparable to that of lincomycin and can be used in vivo for the same purposes and in the same manner as lincomycin. The compounds of the invention are particularly useful because of the relative low toxicity and their effectiveness in rapidly establishing high blood levels. The high in vivo activity is unusual and unexpected in view of the lack of significant antibacterial activity in lincomycin sulfoxide.

DETAILED DESCRIPTION

The starting compounds of Formula II where X is hydroxy are disclosed in U.S. Pat. 3,380,992. Any and all of the compounds disclosed by this patent can be converted to the corresponding compounds of this invention by the process herein described and all such compounds are to be considered as disclosed herein the same as if they had been specifically named.

Starting compounds of Formula II where X is halogen are prepared by acylating a compound of the formula:

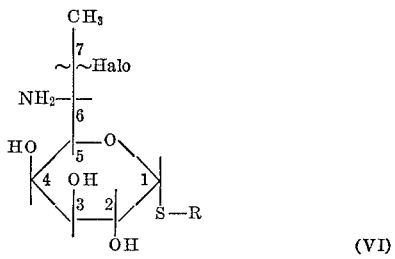

(VI)

wherein R is as given above with a 4-substituted-L-pyrrolidinecarboxylic acid of Formulas A, B, C, D, and E, or by acylation of compounds of Formula II where Ac is hydrogen with acids of Formulas A, B, C, D, or E effected by the procedures of U.S. Pat. 3,380,992.

Starting compounds of the Formula III

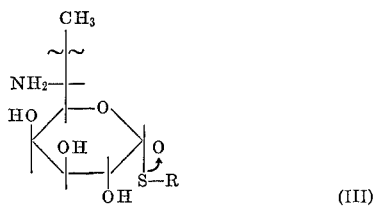

(III)

are described in U.S. Pat. 3,382,230. These starting compounds can be acylated with acids A, B, C, D, or E by the procedures of U.S. Pat. 3,380,992 either before or after the 7-hydroxy is replaced by halogen.

The 7-hydroxy group of any of the above starting compounds can be replaced by halogen by one or another of the above mentioned processes involving thionyl chloride or Rydon reagent, or by a modified Rydon reagent process.

The mechanism by which Rydon reagent effects the substitution of the 7-hydroxy by halogen is not fully understood. The mechanism is such that a change in configuration results. Thus, a 7(R)-hydroxy compound of the D-erythro configuration yields a 7(S)-halo compound of the L-threo configuration. For example 7(S)-chloro-7-deoxylincomycin which is derived from lincomycin (lincomycin has D-erythro configuration), has the L-threo configuration.

Rydon reagents are formed by the addition of halogen to triphenylphosphine or triphenylphosphite or addition of an alkyl halide to triphenylphosphite and can be be represented by the formula:

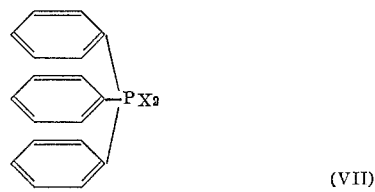

(VII)

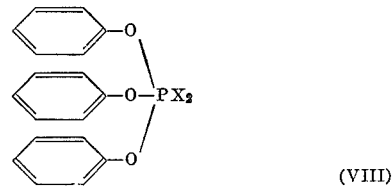

(VIII)

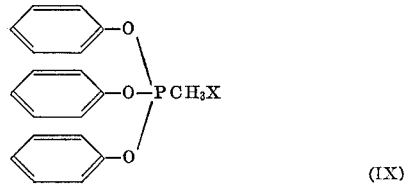

(IX)

wherein X is halogen, e.g., chlorine or bromine Rydon et al., J. Chem. Soc., 2224 (1953); Ibid, 2281 (1954); Ibid, 3043 (1956). The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case the reaction with the lincomycin or related compound is effected by contacting the Rydon reagent therewith in an inert solvent, e.g., acetonitrile or dimethylformamide, until the desired substitution of the 7-hydroxy is obtained. The reaction takes place at ordinary temperature, though gentle heating can be effected if desired. Advantageously the temperature is maintained between about 20° C. and about 55° C. The product can be recovered from the reaction mixture by well-known techniques such as filtration, solvent extraction, etc. The reaction mixture advantageously is treated with methanol to destroy any excess Rydon reagent, filtered to remove any solid such as triphenylphosphine oxide, formed in the reaction, and then treated to recover the product. The methanol can be added either before or after the filtration. Advantageously the treated and filtered reaction mixture is evaporated to dryness and purified by solvent extraction and/or chromatography.

To effect the substitution of the 7-hydroxy with chlorine by the thionyl chloride process, the starting compound of Formula II or V, advantageously in the form of an acid-addition salt, e.g., the hydrochloride, is mixed with thionyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a reasonably clear solution, and then to raise the temperature to between about 50 and 100° C., for example, to the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated with ethanol to convert any residual sulfite intermediates to the desired product. The collected material can then be further purified by solvent extraction and/or recrystallization and can be recovered either as the free base or an acid addition salt.

The proportions of the reagents can be varied widely. Stoichiometrically, however, at least 3 moles of thionyl chloride is required for each mole of starting compound. Any larger amount can be used but ordinarily it is not necessary or desirable to use more than about a 10 fold excess. Advantageously, an excess of about 2 to 3 fold is used. The amount of solvent is not critical and can be varied widely in accordance with the practices in the art. Ordinarily from about 15 to about 30 volumes of solvent for each part of solid starting compound will suffice. The proportion of solvent to thionyl chloride, however, is important because of the solubility of the product in thionyl chloride. If the ratio of solvent to thionyl chloride (v./v.) is high, the desired product precipitates on cooling of the reaction mixture and the work up of the product is simplified. For example, with carbon tetrachloride a mixture of products precipitates directly on cooling the reaction mixture if the v./v. proportion of carbon tetrachloride to thionyl chloride is kept above about 10 to 1.

Substitution of the 7-hydroxy by iodine is effected by a modification of the Rydon reagent process. In this process, the desired halogen substitution is effected simply by mixing the starting compound of Formula II or V with triphenylphosphine and carbon tetraiodide in an inert solvent. The reaction takes place at room temperature (25° C.) but gentle heating up to reflux temperature of 50 to 60° C. can be used.

Acetonitrile and nitromethane are illustrative solvents. The triphenylphosphine and carbon tetraiodide are optimally used in equimolar proportions and advantageously in a substantial molar excess of the starting compound. Optimally about 4 moles of triphenylphosphine and 4 moles of carbon tetraiodide are used for each mole of starting compound of Formula II or V. The process can also be used for effecting chlorination and bromination by substituting carbon tetrachloride or carbon tetrabromide for the carbon tetraiodide.

In carrying out the sulfoxidation of this invention the starting compound in the form of an acid addition salt, suitably the hydrochloride, is dissolved in aqueous hydrogen peroxide with or without a water miscible solvent such as methanol and allowed to stand at room temperature until substantial sulfoxidation is obtained. The proportions are not critical but ordinarily a substantial excess of hydrogen peroxide is used. The temperature may be varied but ordinarily it is neither necessary nor desirable to heat above about 25° C. In place of hydrogen peroxide there can be used either mild oxidizing agents, for example manganese dioxide, or peroxyalkanoic acids, such as peroxyacetic and peroxypropionic acids. Peroxy compounds having a dissociation constant greater than $1.0 \times 10^{-5}$ are undesirable. Also it is desirable if the pH of the reaction medium is not below about pH 5. Advantageously the pH is maintained at or near the pH of the acid addition salt.

Any or all of the 2-, 3-, and 4-hydroxy groups can be esterified either before or after the halogenations, for example, with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms.

Examples of carboxylic acid acyl radicals are the acyl radicals of the following acids: (a) saturated or unsaturated, straight or branched chain aliphatic carboxylic acids, for example acetic, propinoic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids for example, cyclopentaneacetic acid, cyclopentanepropionic acid, cyclopentaneacetic acid, cyclohexanebutyric acid, methylcyclohexane-acetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mono-, di-, and trichloracetic acid; α- and β-chloropropionic acid; α- and γ-bromobutyric acid; α- and β-iodovaleric acid; mevalonic acid; 2- and 4-chlorocyclohexanecarboxylic acid; shikimic acid; 2-nitro-1-methylcyclobutanecarboxylic acid; 1,2,3,4,5,6 - hexachlorocyclohexanecarboxylic acid; 3 - bromo - 2 - methylcyclohexanecarboxylic acid; 4- and 5-bromo-2-methylcyclohexanecarboxylic acid; 5- and 6 - bromo - 2 - methylcyclohexanecarboxylic acid; 2,3 - dibromo - 2 - methylcyclohexanecarboxylic acid; 2,5 - dibromo - 2 - methylcyclohexanecarboxylic acid; 4,5 - di - bromo - 2 - methylcyclohexanecarboxylic acid; 5,6 - dibromo - 2 - methylcyclohexanecarboxylic acid; 3 - bromo - 3 - methylcyclohexanecarboxylic acid; 6 - bromo - 3 - methylcyclohexanecarboxylic acid; 1,6-di-bromo - 3-methylcyclohexanecarboxylic acid; 2-bromo-4 - methylcyclohexanecarboxylic acid; 1,2 - dibromo - 4 - methylcyclohexanecarboxylic acid; 3 - bromo-2,2,3 - trimethylcyclopentanecarboxylic acid; 1-bromo-3,5-dimethylcyclohexanecarboxylic acid; homogentisic acid, o-, m-, and p-chlorobenzoic acid; anisic acid; salicyclic acid; p-hydroxybenzoic acid; β-resorcyclic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecyloxyformic acid; hexadecyloxyformic acid; and the like.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms; or ylidene (e.g., 3,4-O-ylidene) group for example alkylidene, advantageously of not more than 20 carbon atoms and aramethylidine and vinylogs thereof, advantageously of not more than 12 carbon atoms. Examples of alkylidene are given above and examples of aralkylidene are furfurylidene, 5 - methylfurfurylidene, benzylidene, m-tolylidene, o-tolylidene, p-tolylidene, o-chlorobenzylidene, m-chlorobenzylidene, m-bromobenzylidene, p-bromobenzylidene, p-methoxybenzylidene, m-methoxybenzylidene, o-methoxybenzylidene, 3,4-dimethoxybenzylidene, salicylylidene, p-hydroxybenzylidene, 3,4,5 - trimethoxybenzylidene, piperonylidene, o-nitrobenzylidene, p-chlorobenzylidene, m-nitrobenzylidene, p-nitrobenzylidene, β-naphthylidene, p - bromobenzylidene, 2,4 - dichlorobenzylidene, 3 - methoxy - 4 - hydroxy - benzylidene, terephthylidene, 3,4-dihydroxybenzylidene, and cinnamylidene.

The compounds of formula where Ac is hydrogen or contains a basic amino group exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3 - phenylsalicyclic, 5 - phenylsalicyclic, 3 - methylglutaric, orthosulfobenzoic, cyclopentanepropionic, 1,2-cyclohexanedicarboxylic, 4-cyclohexanecarboxylic octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The corresponding free bases can be used as a buffer or as an antacid. The compounds of formula react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The close analogues of the sulfoxides of 7-halo-7-deoxy lincomycin, i.e., where —$R_1H$ is cis or trans alkyl of not more than 8 carbon atoms; $R_3$ is methyl or ethyl; R is alkyl of not more than 8 carbon atoms, have in vivo antibacterial properties and can be used in vivo for the same purposes and in the same way as lincomycin. The corresponding compounds where $R_3$ is hydrogen have like in vivo antibacterial properties and, moreover, have improved gram negative activity. The other analogues and isomers have similar in vivo antibacterial properties and can be used for the same purposes as lincomycin especially where larger amounts are not objectionable.

The following examples are illustrative of the process and products of the present invention but are not to be construed as limiting. The parts and percentages are by weight and the solvent ratios are by volume unless otherwise specified.

EXAMPLE 1

7(S)-chloro - 7 - deoxylincomycin sulfoxide [methyl 7-chloro - 6,7,8-trideoxy - 6 - (trans-1-methyl-4-propyl-L-2-pyrrolidine-carboxamido)-1-thio-L - threo - α-D-galacto-octopyranoside sulfoxide]

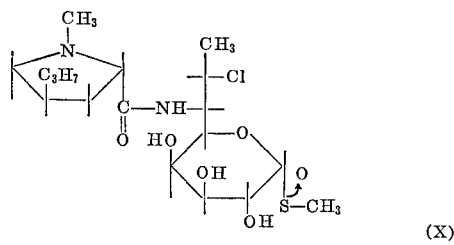

(X)

PART A–1

Thirty grams (0.065 mole) of 7(S)-chloro-7-deoxylincomycin hydrochloride was dissolved in 100 ml. of water, cooled at 25° and 30 ml. of 30% hydrogen peroxide added in one portion. After standing at 25° for 20 hours the excess hydrogen peroxide was destroyed by the addition of platinium oxide. The solution was filtered, adjusted to pH 11 by the addition of potassium hydroxide and extracted with chloroform. The chloroform extracts were dried and evaporated to dryness under vacuum to give 22 g. of a white solid. The solid material was chromatographed over 2 kg. of silica gel in a solvent system composed of methanol:chloroform (1:6 by volume). After 3350 ml. forerun which was discarded, 60 ml. fractions were collected. Fractions 61–95 were combined and evaporated under vacuum to give 16.5 g. of 7(S)-chloro-7-deoxylincomycin sulfoxide, a 58% yield. A portion of this material was dissolved in water, filtered, freeze dried and analyzed.

Analysis.—Calcd. for $C_{18}H_{33}ClN_2O_6S$ (percent): C, 49.02; H, 7.54; N, 6.35; S, 7.27; Cl, 8.04. Found (percent): C, 49.02; H, 7.87; N, 6.78; S, 7.38; Cl, 8.20. $[\alpha]_D^{H_2O}+108°$ (C., 0.700).

Administered orally to mice, 7(S)-chloro-7-deoxylincomycin sulfoxide was about ½ to 1 times as effective as lincomycin.

The 7(S)-chloro-7-deoxylincomycin hydrochloride was prepared as follows:

PART B–1: THE FREE BASE

A suspension of 221.0 g. (0.5 mole) of lincomycin hydrochloride in 5 1. of carbon tetrachloride was stirred well at 25° under nitrogen. 900 ml. of thionyl chloride was added all at once and stirring continued for 2 hr. During this period the solid dissolved and a clear solution was obtained. The reaction mixture was heated at reflux for 2 hr., the heat source then removed and nitrogen bubbled into the amber solution until the pot temperature dropped to 25°. About 4 1. of liquid was removed via vacuum distillation at a pot temperature of less than 35°. The yellow solid which precipitated during this distillation was collected and dried. This solid was dissolved in about 300 ml. of methanol, cooled at 25°, made basic (pH 11) with dilute aqueous sodium hydroxide solution (2 N), diluted to about 1200 ml. with water and extracted well with ether. The ether extracts were combined, washed with a small amount of water, dried over anhydrous magnesium sulfate and filtered. On evaporation of an aliquot of the combined ether extract 7(S)-chloro-7-deoxylincomycin free base is obtained as a yellow amorphous solid.

PART C–1: THE HYDROCHLORIDE

Addition of hydrogen chloride gas to the filtrate of Part B–1 resulted in the precipitation of 7(S)-chloro-7-deoxylincomycin hydrochloride which was separated and recrystallized from ethanol and ethyl acetate. A 32% yield of white, crystalline 7(S)-chloro-7-deoxylincomycin hydrochloride solvated with approximately one molecular proportion of water was obtained.

Analysis.—Calcd. for $C_{18}H_{33}ClN_2O_5S \cdot HCl \cdot H_2O$ (percent): C, 45.18; H, 7.37; Cl, 14.82; N, 5.86; S, 6.70; $H_2O$, 3.77. Found (percent): C, 44.70; H, 7.65; Cl, 14.27; N, 5.78; S, 6.45; $H_2O$, 3.85. $[\alpha]_D^{H_2O}+130°$ (C., 0.9858 g./100 ml.).

EXAMPLE 2

7(S)-bromo-7-deoxylincomycin sulfoxide

PART A–2

By substituting the 7(S)-chloro-7-deoxylincomycin hydrochloride of Example 1 by 7(S)-bromo-7-deoxylincomycin hydrochloride, 7(S)-bromo-7-deoxylincomycin sulfoxide is obtained. The 7(S)-bromo-7-deoxylincomycin hydrochloride was prepared as follows:

PART B–2

A solution of Rydon reagent was prepared by stirring a dry solution of 52.6 g. (0.2 M) of triphenylphosphine and 800 ml. of acetonitrile at 30° under nitrogen and 10 ml. (0.19 M) of bromine added over a 20-min. period. After stirring for 10 min. more, 8.2 g. of lincomycin was added and the reaction stirred at 30° for 18 hrs. A white solid was then present. The reaction was filtered and the solid discarded. Methanol (100 ml.) was added to the filtrate and the solvents then evaporated under vacuum. The viscous residue was dissolved in 100 ml. methanol, diluted with 1800 ml. of water and extracted six times with 200 ml. portions of ether. The ether extracts were discarded, the aqueous phase made basic (pH 11) with aqueous KOH and then extracted four times with 200 ml. portions of methylene chloride. The extracts were dried and evaporated, leaving 11 g. of a yellow solid which was chromatographed over 1 kg. of silica gel using methanol:chloroform 1:9 (v./v.) as the solvent system. After a forerun of 1200 ml., 22 fractions of 56 ml. were collected. The last 6 (fractions 17–22) were pooled and evaporated to dryness yielding 2.8 g. of 7(S)-bromo-7-deoxy-lincomycin. This was converted to the hydrobromide by dissolving in water, adding HBr to pH 1, filtering, and lyophilizing the filtrate. The hydrobromide had an $\alpha_D$ +114° (C., 0.9314, $H_2O$) and the following analysis:

Calcd. for $C_{18}H_{34}Br_2N_2O_5S$ (percent): C, 39.28; H, 6.23; N, 5.09; S, 5.83; Br, 29.04. Found (percent): C, 39.64; H, 6.19; N, 5.07; S, 6.04; Br. 28.59.

EXAMPLE 3

*7(S)-iodo-7-deoxylincomycin sulfoxide*

PART A–3

By substituting the 7(S)-chloro-7-deoxylincomycin hydrochloride of Example 1 by 7(S)-iodo-7-deoxylincomycin hydrochloride, 7(S)-ido-7-deoxylincomycin sulfoxide is obtained. The 7(S)-iodo-7-deoxylincomycin was prepared as follows:

PART B–3

A mixture of lincomycin·HCl (20 g.—0.045 mole), acetonitrile (200 ml.), carbon tetraiodide (100 g.—0.192 mole) and triphenylphosphine (51 g.—0.195 mole) was stirred at 25° for 18 hours, filtered and the filtrate evaporated to dryness under vacuum. The residual oil was shaken well with 1 liter of $CCl_4$ plus 1 liter of aqueous 0.1 N HCl solution. The $CCl_4$ phase was discarded. The aqueous phase was extracted with $CCl_4$ and the extracts discarded. The aqueous phase was filtered, made basic (pH 11) by addition of 4N NaOH aqueous solution and then extracted with $CHCl_3$. The $CHCl_3$ extracts were combined and evaporated to dryness under vacuum to give 12.5 g. of white solid. This material was purified by repeated chromatography over silica gel using a solvent system composed of $CHCl_3:CH_3OH$ (7:1 by volume). The purified product was converted to its hydrochloride salt and recrystallized from ethanol to give 100 mg.— 0.5% yield—of 7(S)-iodo-7-deoxylincomycin hydrochloride as white crystals.

By substituting the lincomycin hydrochloride of Examples 1, 2, and 3 by 7-epilincomycin hydrochloride, U.S. Pat. 3,380,992, the sulfoxides of 7(R)-chloro-, 7(R)-bromo-, and 7(R)-iodo-lincomycin are obtained. By substituting the lincomycin hydrochloride of Examples 1, 2, and 3 by the lincomycin analogs disclosed in U.S. Pat. 3,380,992 the sulfoxides of the corresponding 7(S)-chloro-, 7(R)-chloro-, 7(S)-bromo, 7(R)-bromo-, 7(S)-iodo-, and 7(R)-iodo-lincomycins are obtained.

EXAMPLE 4

*7(S)-chloro-7-deoxylincomycin sulfoxide hydrochloride*

PART A–4

A mixture of 45.98 (0.1 mole) of lincomycin sulfoxide hydrochloride, 1 l. of carbon tetrachloride and 150 ml. of thionyl chloride were stirred and heated at reflux for 3 hours. The solvent and excess thionyl chloride were distilled under reduced pressure. The residual yellow solid was dissolved in 100 ml. of methanol, cooled in an ice bath and enough 6 N potassium hydroxide solution added to make the pH 10. There was then added 1 l. of water and the mixture extracted with chloroform. The chloroform extracts were washed three times with 50 ml. portions of saturated sodium chloride solution, dried and evaporated under reduced pressure. The solid residue was purified by chromatography over a silica gel column using a solvent system composed of methanol:chloroform (1:9). The product fractions, as determined by thin layer chromatographic analysis, were combined and evaporated to give pure 7(S)-chloro-7-deoxylincomycin sulfoxide characterized as in Example 1.

The lincomycin sulfoxide hydrochloride was prepared as follows:

PART B–4

Lincomycin hydrochloride (2.2 g.) was dissolved in 10 ml. of 30% hydrogen peroxide and the reaction mixture was allowed to stand at room temperature for 5 hours. Small portions of platinum oxide were added to the reaction mixture with stirring and the suspension was stirred for 20 hours to destroy excess hydrogen peroxide. The catalyst was removed by filtration and the filtrate was lyophilized to yield 2.3 g. of a white solid, lincomycin sulfoxide hydrochloride.

By following the procedures of Examples 2–B and 3–B, the lincomycin sulfoxide hydrochloride is converted to 7(S)-bromo- and 7(S)-iodolincomycin sulfoxide.

By substituting the lincomycin sulfoxide by the sulfoxide of 7-epi-lincomycin, U.S. Pat. No. 3,380,992, the sulfoxides of 7(R)-chloro-, 7(R)-bromo-, and 7(R)-iodo-lincomycin are obtained.

By substituting the lincomycin sulfoxide by the sulfoxide of the lincomycin analogs disclosed in U.S. Pat. No. 3,380,992, the sulfoxide of the corresponding 7(S)-chloro-, 7(R)-chloro-, 7(S)-bromo-, 7(R)-bromo-, 7(S)-iodo-, and 7(R)-iodo-lincomycin analogs are obtained.

EXAMPLE 5

*7(S)-chloro-7-deoxylincomycin sulfoxide*

PART A–5: METHYL-7-CHLORO-7-DEOXY-1-THIO-α-LINCOSAMINIDE SULFOXIDE

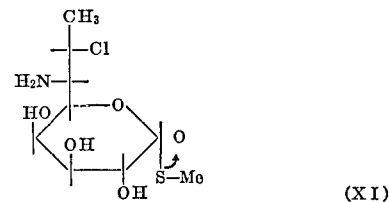

(XI)

To a suspension of 197.2 g. of triphenylphosphine in 1.5 l. of anhydrous acetonitrile was added 52.5 g. of chlorine. With stirring, 19.05 g. of methyl 1-thio-α-lincosaminide sulfoxide (U.S. Pat. 3,382,230) was added. After 2.5 hrs. at ambient temperature, 50 ml. of methanol was added. The mixture was concentrated to a thick syrup. The concentrate was diluted with methylene chloride and extracted three times with water. The aqueous extracts were washed twice with methylene chloride. The extracts were made alkaline with sodium hydroxide and extracted repeatedly with methylene chloride. The organic extract was dried and evaporated under vacuum. The residue was chromatographed over 1.1 kg. of silica gel using chloroform-methanol (4:1) for elution. The major fraction, selected on the basis of its TLC (thin layer chromatography) profile, on crystallization from methanol-water afforded methyl 7-deoxy-7(S)-chloro-1-thio-α-lincosaminide sulfoxide.

PART B-5: 7-DEOXY-7(S)-CHLOROLINCOMYCIN SULFOXIDE

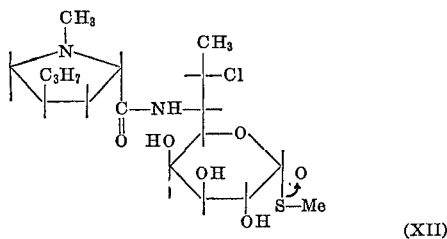

(XII)

A mixture of 915 mg. of trans-4-propyl-L-hygric acid (U.S. Pat. 3,282,956), 1.23 ml. of triethylamine and 600 mg. of isobutylchloroformate in 80 ml. of acetonitrile was stirred at −5° for 15 minutes. A solution of 1.53 g. of methyl 7 - deoxy-7(S)-chloro-1-thio-α-lincosaminide sulfoxide in 20 ml. of water and 20 ml. of acetone was added. The mixture was stirred at ambient temperature for 2 hrs. The mixture was evaporated and the residue extracted with methylene chloride. Evaporation of the solvent yielded an oil. This oil was chromatographed over silica gel using chloroform-methanol (7:1) for elution. The major fraction was recognized as 7-deoxy-7(S)-chlorolincomycin sulfoxide by TLC. It was dissolved in acetone, acidified with dilute HCl and evaporated. The residue was crystallized from absolute ethanol to give 7-deoxy-7(S)-chlorolincomycin sulfoxide.

By substituting the chlorine in part A-5 by bromine, or carbon tetraiodide, there are obtained 7(S)-bromo- and 7(S)-iodo-7-deoxylincomycin sulfoxides as well as the intermediate 7(S)-bromo- and 7(S)-iodo-7-deoxy-1-thio-α-lincosaminide sulfoxides. By substituting the methyl 1-thio-α-lincosaminide sulfoxide by the sulfoxides of other alkyl 1-thio-α-lincosaminide, U.S. Pats. 3,306,892 and 3,316,243, there are obtained the corresponding alkyl 7(S)-chloro-, 7(S)-bromo-, and 7(S)-iodo-7-deoxy-1-thio-α-lincosaminide sulfoxides, and the corresponding lincomycins. By substituting the corresponding 7-hydroxy epimers, there are obtained the sulfoxides of the corresponding alkyl 7(R)-chloro-, 7(R)-bromo-, and 7(R)-iodo compounds.

By substituting the trans-4-propyl-L-hygric acid by other 4-substituted-L-2-pyrrolidine carboxylic acids disclosed in U.S. Pat. 3,301,871, the sulfoxides of the corresponding 7(S)-chloro-, 7(R)-chloro-, 7(S)-bromo-, 7(R)-bromo-, 7(S)-iodo-, and 7(R)-iodo-lincomycins are obtained.

The compounds of the invention (Formula I) can be administered orally to animals, including mammals, for the alleviation of infections caused by gram positive organisms, for example, *Staphylococcus aureus* and *Streptococcus hemolyticus*, in dosages comparable to lincomycin or the corresponding lincomycin analog. They can also be administered parenterally.

We claim:

1. A compound of the formula:

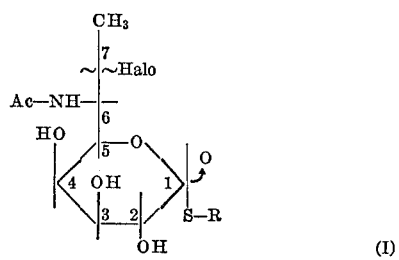

(I)

wherein halo is chlorine, bromine, or iodine; R is alkyl of not more than 20 carbon atoms, cycloalkyl of from 3 to not more than 8 carbon atoms, or aralkyl of not more than 12 carbon atoms; and Ac is hydrogen or the acyl radical of a 4-substituted-L-2-pyrrolidinecarboxylic acid of the formula:

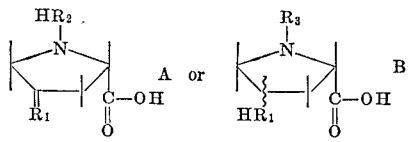

wherein $R_1$, and $R_2$ are alkylidene of not more than 20 carbon atoms, cycloalkylidene of 3 to not more than 8 carbon atoms, or aralkylidene of not more than 12 carbon atoms, and $R_3$ is hydrogen or $HR_2$.

2. A compound according to claim 1 in which Ac is the acyl of a 4-substituted-L-2-pyrrolidinecarboxylic acid.

3. The compound according to claim 2 wherein halo is chlorine, bromine, or iodine; R and $HR_1$ are the same or different alkyl of not more than 8 carbon atoms and $R_3$ is hydrogen or alkyl of not more than 8 carbon atoms.

4. A compound according to claim 3 wherein R is methyl or ethyl; $R_3$ is hydrogen, methyl, or ethyl; and $HR_1$ is ethyl, propyl, butyl, pentyl, or hexyl.

5. A compound according to claim 4 in which halo is in the (S) configuration.

6. A compound according to claim 5 in which R and $R_3$ are methyl and $HR_1$ is trans propyl.

7. A compound according to claim 6 in which halo is chlorine.

8. A compound according to claim 1 in which Ac is hydrogen.

9. A compound according to claim 8 wherein Halo is chlorine, bromine, or iodine; R is alkyl of not more than 8 carbon atoms.

10. A compound according to claim 9 wherein R is methyl or ethyl.

11. A compound according to claim 10 in which halo is in the (S) configuration.

12. A compound according to claim 11 in which halo is chlorine and R is methyl.

13. A process for making a compound of the formula:

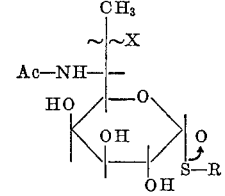

wherein X is hydroxy, chlorine, bromine, or iodine; R is alkyl or not more than 20 carbon atoms, cycloalkyl of 3 to not more than 8 carbon atoms, or aralkyl of not more than 12 carbon atoms; and Ac is hydrogen or a basic carboxacyl group which comprises sulfoxidizing an acid addition salt of a compound of the formula:

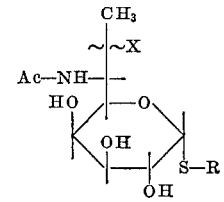

wherein X, R, and Ac are as given above with a peroxy compound having a dissociation constant less than $1.0 \times 10^{-5}$ in a substantially neutral aqueous solution.

14. The process of claim 13 in which X is chlorine, bromine, or iodine.

15. The process of claim 13 in which X is hydroxy, and in which the 7-hydroxy group of the resulting compound is replaced by chlorine, bromine, or iodine by a Rydon reagent process to form a compound of the formula:

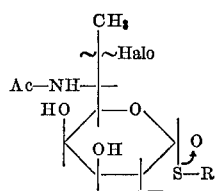

where halo is chlorine, bromine, or iodine and R and Ac are as given above.

16. The process of claim 13 in which the sulfoxidizing agent is hydrogen peroxide.

17. The process of claim 14 in which the sulfoxidizing agent is hydrogen peroxide.

18. The process of claim 15 in which the sulfoxidizing agent is hydrogen peroxide.

19. The process of claim 14 in which Ac is the acyl of a 4-substituted-L-2-pyrrolidinecarboxylic acid.

20. The process of claim 15 in which Ac is the acyl of a 4-substituted-L-2-pyrrolidinecarboxylic acid.

References Cited

UNITED STATES PATENTS

| | | | |
|---|---|---|---|
| 3,243,425 | 3/1966 | Whistler | 260—210 |
| 3,277,077 | 10/1966 | Holly et al. | 260—210 |
| 3,382,230 | 5/1968 | Magerlein | 260—210 |
| 3,435,025 | 3/1969 | Birkenmeyer | 260—210 |

LEWIS GOTTS, Primary Examiner

J. R. BROWN, Assistant Examiner

U.S. Cl. X.R.

424—180